United States Patent
Propp et al.

[11] Patent Number: 5,774,526
[45] Date of Patent: Jun. 30, 1998

[54] RECONFIGURABLE ON-DEMAND TELEPHONE AND DATA LINE SYSTEM

[75] Inventors: Michael B. Propp, Brookline, Mass.; David L. Propp, Ontario, Canada; Christopher P. Ladas, Topsfield, Mass.

[73] Assignee: Adaptive Networks, Inc., Newton, Mass.

[21] Appl. No.: 682,197

[22] Filed: Jul. 17, 1996

Related U.S. Application Data

[60] Provisional application No. 60/001,476, Jul. 18, 1995.
[51] Int. Cl.⁶ .................................................. H04M 11/00
[52] U.S. Cl. ......................... 379/90.01; 455/402; 348/552
[58] Field of Search .............................. 379/66, 90, 201, 379/90.01, 110.01, 111; 340/310 CP, 310 R, 310 A; 348/552; 307/1–5; 455/400–402

[56] References Cited

U.S. PATENT DOCUMENTS

| | | | |
|---|---|---|---|
| 4,495,386 | 1/1985 | Brown et al. | 379/66 |
| 4,523,307 | 6/1985 | Brown et al. | 379/66 |
| 4,782,518 | 11/1988 | Mattley et al. | 379/373 |
| 5,068,890 | 11/1991 | Nilssen | 379/90 |
| 5,070,522 | 12/1991 | Nilssen | 379/90 |
| 5,127,045 | 6/1992 | Cragun et al. | 379/66 |
| 5,210,788 | 5/1993 | Nilssen | 379/90 |
| 5,278,889 | 1/1994 | Papaniclaou et al. | |

FOREIGN PATENT DOCUMENTS

| | | | |
|---|---|---|---|
| 60-51335 | 3/1985 | Japan | 379/66 |
| WO 94/22257 | 9/1994 | WIPO . | |

*Primary Examiner*—Wing F. Chan
*Attorney, Agent, or Firm*—Darby & Darby

[57] ABSTRACT

The present invention is for a system which uses a non-telephone wiring network, such as the existing electrical low voltage wiring of the power line distribution network to provide telephone line service to individual users. The low voltage wiring referred to herein is that used to distribute power to individual businesses and residences, e.g., 120 V single phase residential service. The telephone line service is "on-demand" in the sense that any user can interface a telephone, or other communications device, to the electrical wiring and thereby instantly obtain telephone line service. The system of the present invention may be used to provide primary telephone service to those users who do not wish to pay the expense for dedicated line service. Alternatively, the system of the present invention may be used to provide secondary telephone service, i.e., second, third, . . . line, telephone service for those users who do not wish to pay the expense for dedicated secondary line service. The power line telephone service of the present invention utilizes digital communications over the electrical wiring. When used as primary telephone service, the telephone number associated with the line may be assigned by the telephone company, or utility company, or may be a uniquely assigned telephone number hardwired into each particular telephone to be connected to the electrical wiring. This may also be the case for secondary phone service. Alternatively, for secondary telephone service, the telephone number associated with the power line may be the same number for all telephones connected at a particular user location. The additional "on-demand" telephone lines may be assigned an identifier, such as a suffix appended to the number associated with the particular user location, for use in routing calls to and from the particular "on-demand" line.

58 Claims, 3 Drawing Sheets

5,774,526

RECONFIGURABLE ON-DEMAND TELEPHONE AND DATA LINE SYSTEM

FIELD OF THE INVENTION

The present invention generally relates to the field of telephone and data communication. More specifically, the present invention relates to the use of a non-telephone network, such as a low voltage power line distribution network, as reconfigurable on-demand telephone and data lines.

BACKGROUND OF THE INVENTION

The present day telephone network provides telephone and data communication services to a number of individual users. Each user is assigned a unique telephone number and is provided with a dedicated line or subscriber loop from the user's location to the telephone company central office. Typically, the distance from the user location to the central office is on the order of a few miles. The central office provides the connectivity between the individual users and the rest of the telephone network.

Each user subscriber loop may have a number of telephones and other communications devices, e.g., fax machines and modems, connected to it. However, since these devices are all connected to the same telephone line, only one telephone call ay be placed at any one time. For example, when using a combined phone/fax machine, either a voice call via the telephone or a fax communication via the fax machine may be maintained at any one given time. Similarly, when a combined phone/modem is used, either a voice call via the telephone or a data call via the modem may be maintained at any one time. Oftentimes, it is desirable to be able to place a voice call and either a data call or a fax call simultaneously, such as when two people are talking on the phone and then one wishes to transmit to the other either a fax or a data file which is to be discussed further. With a single line assigned to each user, the only solution is to terminate the voice call, transmit the fax or data, and then initiate a subsequent voice call. This approach is extremely inconvenient.

A further solution to the above problem of simultaneous communication is to provide each user with more than one dedicated line. When a user is provided with two dedicated lines, one may be used for voice communication while the other is simultaneously used for fax or data communication. The provision of multiple dedicated lines to each user also addresses the problem of simultaneous voice communication with different parties. This situation arises when more than one person located at the user location wishes to conduct a voice call with a different party. Each person can then initiate a different voice call on each of the different subscriber lines.

One disadvantage of providing multiple lines to each user is the added system complexity and bandwidth required to administer such a system. A further significant disadvantage to the user is the added cost associated with the extra line(s)—particularly in view of the fact that the second (or additional) line may only be used very infrequently and for very short periods of time. The cost disadvantage associated with a second line is equally applicable to a single line configuration in many instances. This is due to the fact that the installation and activation of a telephone line is a fairly involved bureaucratic procedure. This inconvenience for the user is greatly amplified when the telephone line is only needed for a short, temporary time. For example, in the case of a temporary residence, college dormitory, summer house or the like, it is often inconvenient to have a telephone line installed and activated, only to have it removed a short while later.

OBJECTS OF THE INVENTION

It is an object of the present invention to provide a system for providing telephone line service using non-telephone line wires, such as the existing power line distribution network.

It is a further object of the present invention to provide a system for dynamically providing reconfigurable telephone line service using non-telephone line wires, such as the power line distribution network.

It is an additional object of the present invention to provide a system for dynamically providing one or more "on-demand" telephone lines to a user by way of non-telephone line wires, such as the power line distribution network.

SUMMARY OF THE INVENTION

The present invention is for a system which uses a non-telephone wiring network, such as the existing electrical low voltage wiring of the power line distribution network to provide telephone line service to individual users. The low voltage wiring referred to herein is that used to distribute power to individual businesses and residences, e.g., 120 V single phase residential service. The telephone line service is "on-demand" in the sense that any user can interface a telephone, or other communications device, to the electrical wiring and thereby instantly obtain telephone line service. The system of the present invention may be used to provide primary telephone service to those users who do not wish to pay the expense for dedicated line service. Alternatively, the system of the present invention may be used to provide secondary telephone service, i.e., second, third, . . . line, telephone service for those users who do not wish to pay the expense for dedicated secondary line service.

The power line telephone service of the present invention utilizes digital communications over the electrical wiring. When used as primary telephone service, the telephone number associated with the line may be assigned by the telephone company, or utility company, or may be a uniquely assigned telephone number hardwired into each particular telephone to be connected to the electrical wiring. This may also be the case for secondary phone service. Alternatively, for secondary telephone service, the telephone number associated with the power line may be the same number for all telephones connected at a particular user location. The additional "on-demand" telephone lines may be assigned an identifier, such as a suffix appended to the number associated with the particular user location, for use in routing calls to and from the particular "on-demand" line.

In addition to using the existing power line distribution network, the telephone service of the present invention may be provided using any wiring system, such as the cable or CATV network wiring.

The low voltage power distribution network includes power transformers which typically connect to approximately twelve locations in the U.S. system. The number of locations connected to each transformer may be higher or lower, depending on the particular system in place. These power transformers have associated with them a system controller for routing calls to the primary phone lines associated with the particular locations connected to the transformer, as well as to the additional "on-demand" lines associated with each location. Since multiple telephones may be used on a single physical communications medium, a multi-access method, such as token passing, is used to control access to the communications medium. A power line communications apparatus, such as that disclosed in U.S. Pat. No. 4,815,106, which is incorporated herein by reference, or the like, is used to interface the power line to the telephone devices.

BRIEF DESCRIPTION OF THE DRAWINGS

Other objects, features and advantages of the invention discussed in the above brief explanation will be more clearly understood when taken together with the following detailed description of an embodiment which will be understood as being illustrative only, and the accompanying drawings reflecting aspects of the embodiment, in which.

DETAILED DESCRIPTION OF THE PREFERRED EMBODIMENTS

Figure 1:
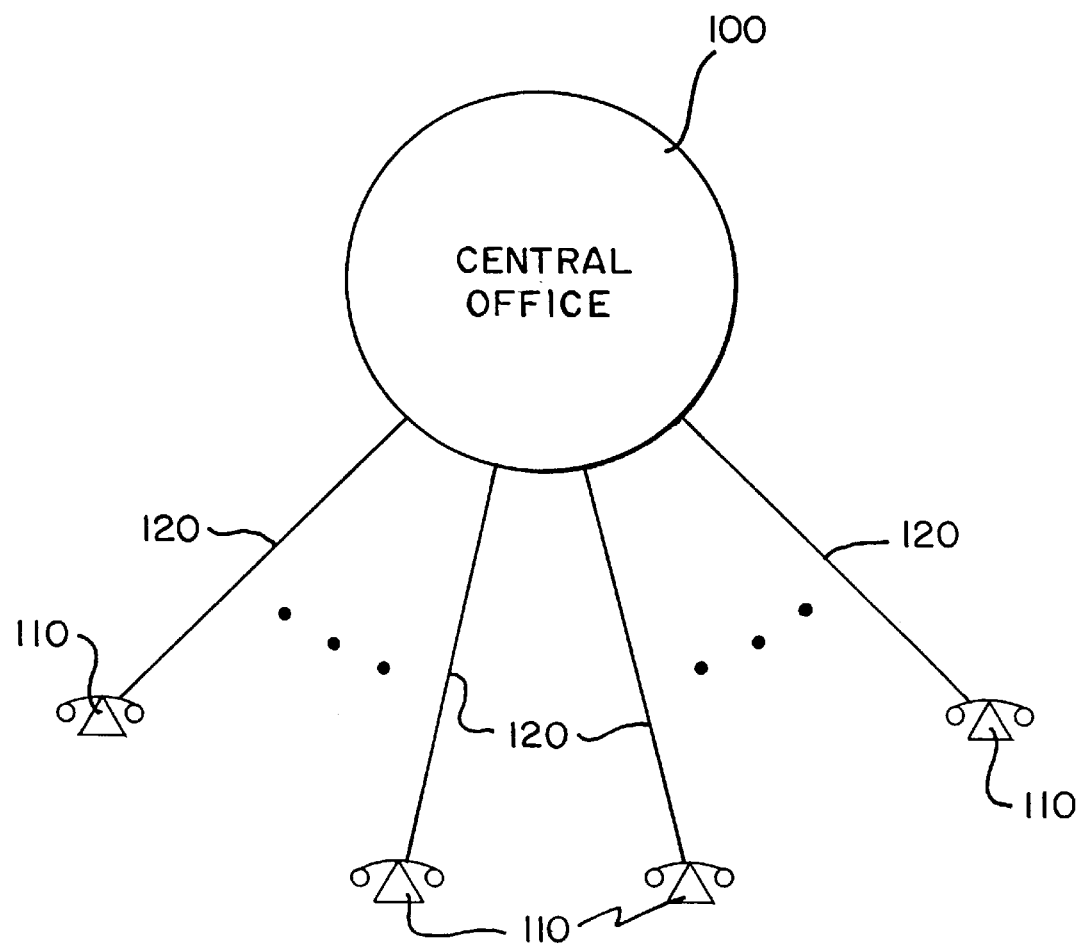
FIG. 1 is a block diagram of a prior art telephone network wiring.

Referring to FIG. 1, therein is shown a portion of the wiring of a conventional telephone network. A central office 100 is connected to individual users or subscribers 110 via dedicated subscriber loops 120. Each user 110 that desires additional telephone lines for communication must install and pay the monthly service charge for additional subscriber loops 120. This requires that a dedicated wire pair be provided from the central office 100 to the subscriber 110. As discussed above, a full service charge must be paid for the additional subscriber loop, even though it is used only infrequently.

Figure 2:
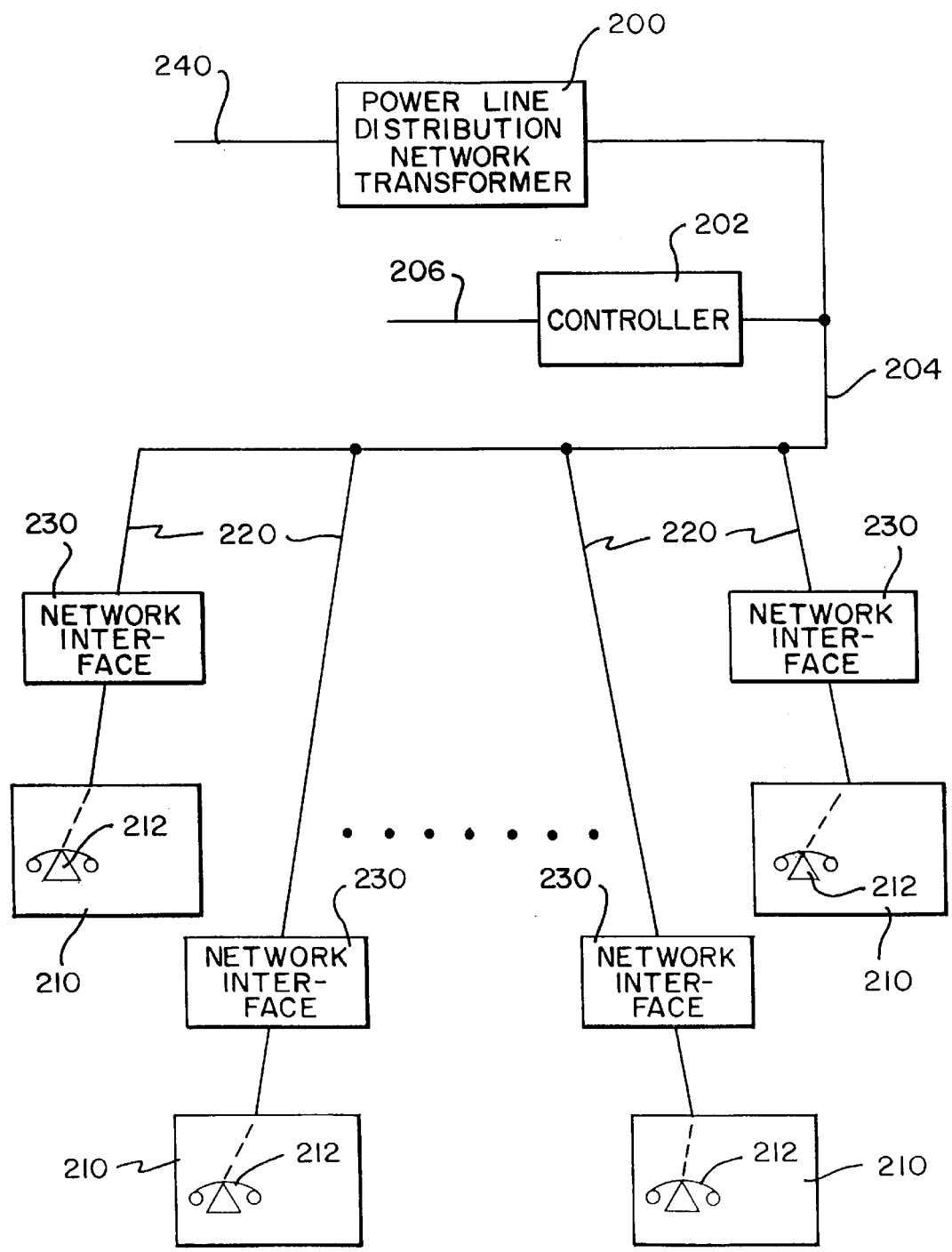
FIG. 2 is a block diagram of a power line distribution network used to provide "on-demand" telephone service.

FIG. 2 shows the use of a power line distribution network via transformer 200 for providing telephone service to individual user locations 210 via the electrical low voltage wiring or power line 220 which connects each user location 210 to the power line network transformer 200 via line 204. Transformer 200 is connected to the higher voltage network by way of line 240. Connected to transformer 200 is controller 202, which performs the necessary control functions to implement the present invention, as will be discussed in greater detail. The controller 202 may be placed on line 204 or on any of lines 220. A power line interface device 230 is placed between each user location 210 and the power line 220. Interface device 230 may be a power line communications device constructed in accordance with U.S. Pat. No. 4,815,106 which enables digital data communication over power lines. Alternatively, interface device 230 may be provided as an internal component of the telephone apparatus, such that telephone service may be obtained by plugging the telephone apparatus into a power socket. Interface device 230 may also be configured to provide the conventional BORSCHT fictions (Battery, Overvoltage, Ringing, Supervision, Coding, Hybrid and Test) that are commonly provided by a SLIC (Subscriber Line Interface Circuit), as well as optional battery backup functionality.

Controller 202 performs the local power line network management and control functions. These functions include local address allocation and management, such as dynamic address assignment and network address/phone number association, and administering network access using dynamic voice/data channel allocation and management. Additionally, controller 202 performs local network monitoring, including performance monitoring, error/fault detection, fault location monitoring and remote node diagnostics. Controller 202 also provides high speed multiplexing to multiplex/demultiplex voice/data packets to and from higher level switching systems. Additional operational, administrative, maintenance and provisioning (OAM+P) functions, such as unit diagnostics and signalling translation (to local addresses) may be performed by controller 202.

In one embodiment according to the present invention, each user location 210 is assigned a conventional telephone number. This number is associated with the primary telephone apparatus 212 at location 210. Additional "on-demand" telephone lines required at the user location are assigned the conventional phone number of location 210, in addition to a suffix identifying the particular "on-demand" telephone line at each location 210. The assignment of the "on-demand" telephone lines may be dynamically performed by controller 202 each time an additional telephone is connected.

For example, location 210 may be assigned telephone number "555-1212" with additional "on-demand" lines assigned "555-1212-1"; "555-1212-2" and so on. Calls to location 210 are then routed to the first available telephone. Thus, when no calls are active at location 210, and a call is routed to location 210, it will activate primary telephone apparatus 212. For the next call, controller 202 senses that the primary number is in use, so the call will be routed to the first "on-demand" line, i.e., "555-1212-1". An analogous procedure is applied for outgoing calls. The first call originating from location 210 is treated as originating from the primary telephone number. The next call is treated as originating from the first "on-demand" line "555-1212-1". In this way, telephone lines are available at each location 210 in an "on-demand" fashion, with the temporary administration of these lines being coordinated by controller 202. User billing for the "on-demand" lines may be calculated taking into account various factors such as the total time a telephone is connected, the total time a connected telephone is off-hook, and the number and duration of inbound and/or outbound calls, including the use of simultaneous communication channels.

In an alternative embodiment according to the present invention, each telephone is dynamically assigned an identification number when it is plugged in. When an incoming call is received, the controller 202 rings all telephones connected at a particular user location 210, i.e., those telephones whose identification numbers map to a specific phone number. The call is routed to the first telephone to answer. When the next incoming call is received, all telephones not in use are rung by the controller 202. This call is then routed to the first telephone that answers. This same procedure is carried out for subsequent incoming calls. A similar procedure is carried out for outbound calls, i.e., the first telephone at user location 210 to place a call is dynamically assigned a line. All subsequent telephones at location 210 are dynamically assigned lines as they place further calls.

Alternatively, a single telephone number may be assigned to transformer 200, with all of the telephones connected to transformer 200 being assigned a suffix identifier appended to the telephone number of transformer 200. In this embodiment, locations 210 do not have to pay for a continuous, dedicated subscriber loop. Rather, whenever a telephone line is needed at any of locations 210, the plugging in of the telephone apparatus results in the assignment of an "on-demand" telephone line.

In an alternative embodiment according to the present invention, the use of suffixes may be eliminated altogether and replaced with a system of unique telephone apparatus identification numbers embedded within each telephone. This is similar to the use of telephone apparatus serial numbers commonly used in cellular telephone systems.

Since multiple devices are accessing a common physical communications channel, a multi-access method, such as that employed by local area networks (LAN) or wide area networks (WAN) is used to coordinate access. The communications system used with the present invention may be a packet-type digital messaging system, wherein each data packet includes header information specifying the intended recipient. This header information may be the conventional telephone number, the logical network address associated with the conventional telephone number, or it may also include the suffix information, depending on the particular system being implemented. In order to be substantially transparent to the rest of the public switched telephone network (PSTN), the header information would include standard header information, e.g., the phone number. The management of the packet data on a suffix level is then carried out by each controller 202. Alternatively, the header information may include the suffix information, or the unique telephone serial number.

Figure 3:
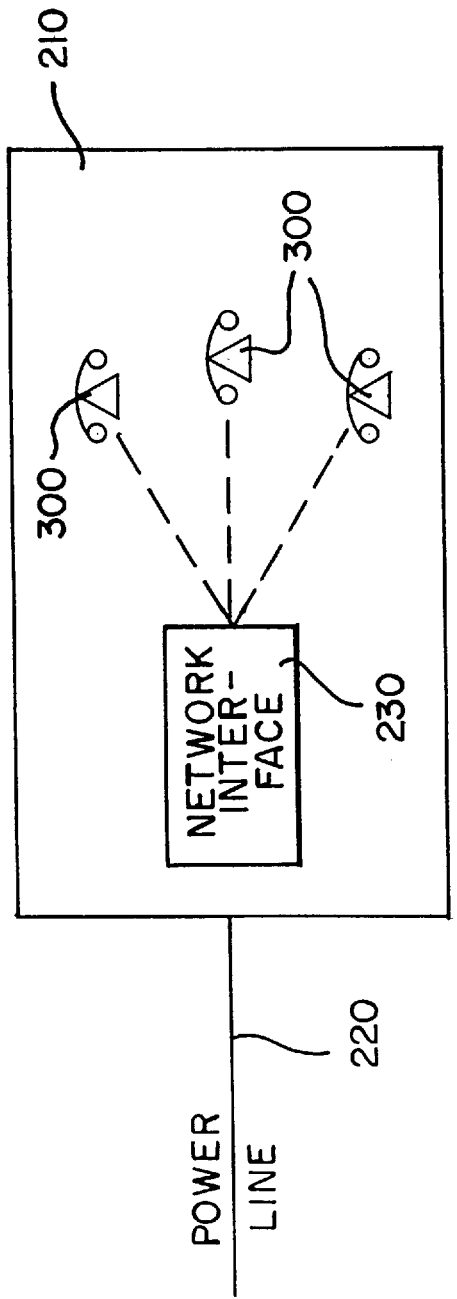
FIG. 3 is a block diagram of a user location illustrating the connection of "on-demand" telephone lines according to the present invention.

Referring now to FIG. 3, therein is shown a user location 210 which is connected to a power distribution network via a power line. Network interface device 230 may be internal or external to the user location, as long as it provides the necessary interfacing function. Additionally, network interface device 230 may be configured to interface only one telephone terminal 300 on one line, or alternatively may be configured to interface a number of telephone terminals 300 on one line. Alternatively, network interface device 230 may be configured to interface a number of lines. Connected to power line 220 via network interface devices 230 are one or more telephone terminals 300. As more telephone lines are required, additional telephone terminals 300 may be connected. Additional data communications equipment, such as modems, fax machines, and the like may similarly be connected to network interface devices 230.

The network-side connection 206 of controller 202 (FIG. 2) may be directly connected to a conventional telephone company central office, or alternatively may be connected to a higher level switching apparatus associated with controller 202, which in turn is connected to the telephone network. This connection may be via wire, cable, microwave, radiowave or optical link. Alternatively, the connectivity may be via the higher voltage line, such as line 240. These approaches allow the system of the present invention to provide a system approaching, and possibly equivalent, to that of a local telephone operating company.

While the invention has been particularly shown and described with reference to a preferred embodiment thereof, it will be understood by those skilled in the art the various changes in form and details may be made therein without departing from the spirit and scope of invention.

What is claimed:

1. A system for providing communication channels between one or more communication devices at a user location and a telephone network using a non-telephone wiring network, comprising:

a controller connected to said non-telephone wiring network for controlling incoming and outgoing communications over said non-telephone wiring network;

a non-telephone wiring network interface device to connect each communication device at a user location to the non-telephone wiring network; and said controller comprising an identification number assignment circuit adapted to dynamically assign an identification number to each communication device upon connection to said non-telephone wiring network at said user location.

2. The system of claim 1, wherein said non-telephone wiring network includes a power line distribution network.

3. The system of claim 1, wherein said non-telephone wiring network includes a CATV network.

4. The system of claim 1, further comprising:

an incoming channel connection circuit which rings all communication devices which are not in use and which are connected at said user location when an incoming communication channel is intended for that user location and connects the incoming communication channel to the first communication device at the user location to answer, said incoming channel connection circuit adapted to ring the remaining connection devices not in use if additional incoming communication channels are intended for that user location; and an outgoing communication channel connection circuit adapted to provide an outgoing communication channel to each communication device at said user location which requires an outgoing communication channel.

5. A method of providing communication channels between one or more communication devices at a user location and a telephone network using a non-telephone wiring network, comprising the steps of:

using a controller connected to said non-telephone wiring network for controlling incoming and outgoing communications over said non-telephone wiring network;

assigning a telephone number to a first communication device connected to said non-telephone wiring network at said user location, and providing said first communication device with a communication channel over said non-telephone wiring network;

providing additional communication channels over said non-telephone wiring network for each additional communication device connected to said non-telephone wiring network at said user location; and dynamically assigning a secondary telephone number to each said additional communication device upon connection to the network at said user location, each said secondary telephone number including said telephone number and an identifier identifying the particular additional communication device connected at said user location.

6. The method of claim 5, further comprising the steps of:

dynamically assigning a secondary telephone number to said first communication device connected at said user location.

7. The method of claim 5, further comprising the steps of:

assigning a secondary telephone number to said first communication device connected at said user location.

8. The method of claim 5, further comprising the steps of:

dynamically assigning a telephone number to each said additional communication device connected at said user location; and wherein the assignment of said telephone number to said first communication device is performed dynamically.

9. The method of claim 5, further comprising the steps of:

dynamically assigning a secondary telephone number to said first communication device connected at said user location.

10. The method of claim 5, further comprising the steps of:

assigning a telephone number to each said additional communication device connected at said user location.

11. The method of claim 10, further comprising the steps of:

routing a first outgoing communication channel from said first communication device connected at said user location; and routing additional outgoing communication channels in turn from said additional communication devices identified by each said telephone number and connected at each said user location.

12. The method of claim 10, further comprising the steps of:

routing a first incoming communication channel to said first communication device connected at said user location; and routing additional incoming communication channels in turn to said additional communication devices identified by each said telephone number and connected at said user location.

13. The method of claim 5, wherein said non-telephone wiring network includes a CATV network.

14. The method of claim 5, wherein said non-telephone wiring network includes a power line distribution network.

15. By The method of claim 5, further comprising the steps of:

assigning a secondary telephone number to each said additional communication device connected at said user location, each said secondary telephone number comprising said telephone number and an identifier identifying the particular additional communication device connected at said user location.

16. The method of claim 15, further comprising the steps of:

assigning a secondary telephone number to said first communication device connected at said user location.

17. The method of claim 15, further comprising the steps of:

routing a first incoming communication channel to said first communication device connected at said user location; and routing additional incoming communication channels in turn to said additional communication devices identified by each said secondary telephone number and connected at said user location.

18. The method of claim 15, further comprising the steps of:

routing a first outgoing communication channel from said first communication device connected at said user location; and routing additional outgoing communication channels in turn from said additional communication devices identified by each said secondary telephone number and connected at said user location.

19. A method of providing identification numbers to one or more communication devices at a user location communicating with a telephone network using a non-telephone wiring network, comprising the steps of:

using a controller connected to said non-telephone wiring network for controlling incoming and outgoing communications over said non-telephone wiring network;

using a non-telephone wiring network interface device to connect each communication device at a user location to the non-telephone wiring network; and dynamically assigning an identification number to each communication device upon connection to said non-telephone wiring network at said user location.

20. The method of claim 19, further comprising the steps of:

(a) ringing all communication devices which are not in use and which are connected at said user location when an incoming communication channel is intended for that user location;

(b) connecting the incoming communication channel to the first communication device at the user location to answer; and repeating steps (a) and (b) if additional incoming communication channels are intended for that user location.

21. The method of claim 19, wherein the communication devices at said user location correspond to those communication devices associated with one of a particular identification number and a telephone number.

22. The method of claim 19, further comprising the steps of:

providing an outgoing communication channel to each communication device at said user location which requires an outgoing communication channel.

23. The method of claim 19, wherein said non-telephone wiring network includes a power line distribution network.

24. The method of claim 19, wherein said non-telephone wiring network includes a CATV network.

25. A method of providing communication channels between one or more communication devices at a user location and a telephone network using a non-telephone wiring network, comprising the steps of:

using a controller connected to said non-telephone wiring network for controlling incoming and outgoing communications over said non-telephone wiring network;

using a non-telephone wiring network interface device to connect each communication device at a user location to the non-telephone wiring network; and assigning an identification number to each communication device connected to said non-telephone wiring network at each user location, and dynamically providing each said communication device with a communication channel over said non-telephone wiring network, when each said communication device requires a communication channel.

26. The method of claim 25, wherein said non-telephone wiring network includes a power line distribution network.

27. The method of claim 25, wherein said non-telephone wiring network includes a CATV network.

28. A method of providing communication channels between one or more communication devices at a user location and a telephone network using a non-telephone wiring network, comprising the steps of:

using a controller connected to said non-telephone wiring network for controlling incoming and outgoing communications over said non-telephone wiring network;

using a non-telephone wiring network interface device to connect each communication device at a user location to the non-telephone wiring network; and dynamically assigning an identification number and a communication channel to each communication device connected to said non-telephone wiring network at said user location, when each said communication device requires a communication channel.

29. The method of claim 28, wherein said non-telephone wiring network includes a power line distribution network.

30. The method of claim 28, wherein said non-telephone wiring network includes a CATV network.

31. A method of providing communication channels from one or more communication devices at a user location and a telephone network using a non-telephone wiring network, comprising the steps of:

using a controller connected to said non-telephone wiring network for controlling incoming and outgoing communications over said non-telephone wiring network;

using a non-telephone wiring network interface device to connect each communication device at a user location to the non-telephone wiring network; assigning a telephone number to said controller; and assigning said telephone number and an identifier to each communication device connected to said non-telephone wiring network and associated with said controller, and dynamically providing each said communication device with a communication channel over said non-telephone wiring network, when each said communication device requires a communication channel.

32. The method of claim 31, wherein said non-telephone wiring network includes a power line distribution network.

33. The method of claim 31, wherein said non-telephone wiring network includes a CATV network.

34. A method of providing communication channels between one or more communication devices at a user location and a telephone network using a non-telephone wiring network, comprising the steps of:

using a controller connected to said non-telephone wiring network for controlling incoming and outgoing communications over said non-telephone wiring network, using a non-telephone wiring network interface device to connect a communication device at a user location to the non-telephone wiring network, dynamically assigning an identification number and a communication channel to each communication device connected to the network at said user location, when each said communication device requires a communication channel, and billing a user for usage depending on at least one of a total time a communication device is connected to the non-telephone wiring network, a total time a communication device is used, a number of incoming communications, a number of outgoing communications, a duration of incoming communications, a number of simultaneous communication channels and a duration of outgoing communications.

35. The method of claim 34, wherein said non-telephone wiring network includes a power line distribution network.

36. The method of claim 34, wherein said non-telephone wiring network includes a CATV network.

37. The method of any of claims 1, 16, 19, 25, 28, 31 or 34, wherein said communication device is one of a telephone set, fax machine, modem, smartphone, messaging system and a computer.

38. A system for providing communication channels between one or more communication devices at a user location and a telephone network using a non-telephone wiring network, comprising:

a controller connected to said non-telephone wiring network for controlling incoming and outgoing communications over said non-telephone wiring network;

a non-telephone wiring network interface device to connect each communication device at a user location to the non-telephone wiring network;

said controller including a telephone assignment circuit adapted to assign a telephone number to a first communication device connected to said non-telephone wiring network at each user location, and a communication channel assignment circuit adapted to provide each said first communication device with a communication channel over said non-telephone wiring network; and said communication channel assignment circuit also adapted to dynamically provide additional communication channels over said non-telephone wiring network for additional communication devices as the devices are connected to said non-telephone wiring network at said user location.

39. The system of claim 38, wherein said non-telephone wiring network includes a power line distribution network.

40. The system of claim 38, wherein said non-telephone wiring network includes a CATV network.

41. A system for providing communication channels between a communication device at a user location and a telephone network using a non-telephone wiring network, comprising:

a controller connected to said non-telephone wiring network for controlling incoming and outgoing communications over said non-telephone wiring network;

a non-telephone wiring network interface device to connect a communication device at a user location to the non-telephone wiring network;

said controller including a telephone assignment circuit adapted to assign at least one telephone number to said communication device connected to said non-telephone wiring network at said user location, and a communication channel assignment circuit adapted to dynamically provide said communication device with one or more communication channels over said non-telephone wiring network as those channels are needed.

42. The system of claim 41, wherein said non-telephone wiring network includes a power line distribution network.

43. The system of claim 41, wherein said non-telephone wiring network includes a CATV network.

44. A method of providing communication channels between a communication device at a user location and a telephone network using a non-telephone wiring network, comprising the steps of:

using a controller connected to said non-telephone wiring network for controlling incoming and outgoing communications over said non-telephone wiring network;

using a non-telephone wiring network interface device to connect a communication device at a user location to the non-telephone wiring network;

assigning at least one telephone number to said communication device connected to said non-telephone wiring network at said user location, and providing said communication device with one or more communication channels over said non-telephone wiring network; and dynamically assigning a secondary telephone number to each additional communication device upon connection to the network at said user location, each said secondary telephone number comprising said telephone number and an identifier identifying the particular additional communication device connected at the user location.

45. The method of claim 44, wherein said non-telephone wiring network includes a power line distribution network.

46. The method of claim 44, wherein said non-telephone wiring network includes a CATV network.

47. A system for providing communication channels between one or more communication devices at a user location and a telephone network using a non-telephone wiring network, comprising:
- a controller connected to said non-telephone wiring network for controlling incoming and outgoing communications over said non-telephone wiring network;
- a non-telephone wiring network interface device to connect each communication device at each user location to the non-telephone wiring network; and
- said controller comprising an identification number assignment circuit adapted to assign an identification number to each communication device connected to said non-telephone wiring network at each user location, and a communication channel assignment circuit adapted to dynamically provide each said communication device with a communication channel over said non-telephone wiring network, when each said communication device requires a communication channel.

48. The system of claim 47, wherein said non-telephone wiring network includes a CATV network.

49. The system of claim 47, wherein said non-telephone wiring network includes a power line distribution network.

50. A system for providing communication channels between one or more communication devices at a user location and a telephone network using a non-telephone wiring network, comprising:
- a controller connected to said non-telephone wiring network for controlling incoming and outgoing communications over said non-telephone wiring network;
- a non-telephone wiring network interface device to connect each communication device at a user location to the non-telephone wiring network; and
- said controller comprising an identification number and communication channel assignment circuit adapted to dynamically assign an identification number and a communication channel to each communication device connected to said non-telephone wiring network at said user location, when each said communication device requires a communication channel.

51. The system of claim 50, wherein said non-telephone wiring network includes a CATV network.

52. The system of claim 50, wherein said non-telephone wiring network includes a power line distribution network.

53. A system for providing communication channels from one or more communication devices at a user location and a telephone network using a non-telephone wiring network, comprising:
- a controller connected to said non-telephone wiring network for controlling incoming and outgoing communications over said non-telephone wiring network, said controller being assigned a telephone number;
- a non-telephone wiring network interface device to connect each communication device at a user location to the non-telephone wiring network; and
- said controller comprising a telephone number and identifier assignment circuit adapted to assign said telephone number and an identifier to each communication device connected to said non-telephone wiring network and associated with said controller, said assignment circuit being adapted to dynamically provide each said communication device with a communication channel over said non-telephone wiring network, when each said communication device requires a communication channel.

54. The system of claim 53, wherein said non-telephone wiring network includes a CATV network.

55. The system of claim 53, wherein said non-telephone wiring network includes a power line distribution network.

56. A system for providing communication channels between one or more communication devices at a user location and a telephone network using a non-telephone wiring network, comprising:
- a controller connected to said non-telephone wiring network for controlling incoming and outgoing communications over said non-telephone wiring network:
- a non-telephone wiring network interface device to connect each communication device at a user location to the non-telephone wiring network,
- said controller including a telephone assignment circuit adapted to assign a telephone number to a first communication device connected to said non-telephone wiring network at the user location, and a communication channel assignment circuit adapted to provide said first communication device with a communication channel over said non-telephone wiring network, said communication channel assignment circuit also adapted to dynamically provide additional communication channels over said non-telephone wiring network for additional communication devices connected to the network at the user location, when each said communication device requires a communication channel; and
- a billing circuit adapted to bill a user for usage depending on at least one of a total time a communication device is connected to the non-telephone wiring network, a total time a communication device is used, a number of incoming communications, a number of outgoing communications, a duration of incoming communications, a number of simultaneous communication channels and a duration of outgoing communications.

57. The system of claim 56, wherein said non-telephone wiring network includes a CATV network.

58. The system of claim 56, wherein said non-telephone wiring network includes a power line distribution network.

* * * * *